(12) United States Patent
Tsuji

(10) Patent No.: US 10,310,789 B2
(45) Date of Patent: Jun. 4, 2019

(54) IMAGE FORMING APPARATUS AND CONTROL METHOD FOR IMAGE FORMING APPARATUS

(71) Applicant: KYOCERA Document Solutions Inc., Osaka (JP)

(72) Inventor: Takuya Tsuji, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/020,512

(22) Filed: Jun. 27, 2018

(65) Prior Publication Data

US 2018/0373480 A1    Dec. 27, 2018

(30) Foreign Application Priority Data

Jun. 27, 2017   (JP) .................................. 2017-125448

(51) Int. Cl.
*G06F 3/12* (2006.01)

(52) U.S. Cl.
CPC .......... *G06F 3/1256* (2013.01); *G06F 3/1208* (2013.01)

(58) Field of Classification Search
USPC ....................................................... 358/1.14
See application file for complete search history.

(56) References Cited

U.S. PATENT DOCUMENTS

2007/0046995 A1* 3/2007 Toda .................... G06F 3/1204
358/1.16

FOREIGN PATENT DOCUMENTS

JP          2003-304358 A    10/2003

* cited by examiner

*Primary Examiner* — Neil R McLean
*Assistant Examiner* — Darryl V Dottin
(74) *Attorney, Agent, or Firm* — Stein IP, LLC

(57) ABSTRACT

The image forming apparatus includes a reading unit, a setting detection unit for detecting a document setting, a display panel, an operation unit, a storage unit, a control unit, and a job execution unit. Upon recognizing a document setting onto the reading unit, the control unit controls the reading unit to execute precedent reading for reading the set document. The control unit controls the storage unit to store precedently-read image data that are image data acquired by the precedent reading. The control unit controls the display panel to display a setting screen corresponding to a job type selected by the operation unit.

10 Claims, 10 Drawing Sheets

IMAGE FORMING APPARATUS AND CONTROL METHOD FOR IMAGE FORMING APPARATUS

INCORPORATION BY REFERENCE

This application is based upon and claims the benefit of priority from the corresponding Japanese Patent Application No. 2017-125448 filed on Jun. 27, 2017, the entire contents of which are incorporated herein by reference.

BACKGROUND

The present disclosure relates to an image forming apparatus for reading documents, as well as to an image forming apparatus control method.

Image forming apparatuses for reading a document to generate image data are available. Such an image forming apparatus is enabled to execute a job based on image data acquired by reading process. In the case of a copy job, the image forming apparatus performs printing based on the image data acquired by the reading process. There is known an apparatus, as described below, capable of shortening working time for a job involving document reading process.

Specifically, there has been known an image forming apparatus which includes: a first-setting input part for performing first setting related to document reading conditions such as exposure density, area adaptation processing, resolution, and scale-up/down; a first-setting end key to be operated upon an end of the first setting; a second-setting input part for performing second setting such as number of copies, post-processing, page-number addition, destination of facsimile transmission, and destination of image data transmission, which are unrelated to document reading conditions; a start key; a first control means on which a document is to be set and which, upon operation of the first-setting end key, starts document reading based on the first setting to store reading contents into image memory while blocking copy start, facsimile transmission and image transfer; and a second control means which, upon operation of the start key, executes copy start, facsimile transmission and image transfer of image data read based on the second setting. The image forming apparatus is enabled to work for setting in relation to image formation and image transmission during the course of document reading.

Normally, when the start key is operated, the image forming apparatus starts document reading. The start key is operated at a time point when setting process related to a job has been completed and the job is going to be started. That is, document reading is executed after the entire setting related to a job has been completed by the user.

In the case of a job involving document reading, the document reading is started after the setting is done by the user. Upon completion of the document reading, printing or transmission is executed based on image data acquired by the reading. Therefore, as far as jobs involving document reading are concerned, there is a problem that required time from setting start until job completion may be elongated.

In contrast, with the above-described prior art, document reading is started at a time point when part of the setting process has been completed. Then, image data of a document is generated during the course in which the rest of the setting process is filled up. As a result, printing or transmission may be started immediately upon the operation of the start key. The required time from setting start until job completion may also be shortened. However, there arises a need for performing the setting process in two steps dividedly. After a first-stage setting has been done, a second-stage setting is performed. As a result, the setting operation is complicated, causing a fear that the user may be burdened to more extent. Also when it is desired to redo the first-stage setting after the document reading has been started, there is a fear that the setting operation may be complicated.

SUMMARY

An image forming apparatus according to an aspect of the present disclosure includes: a reading unit, a setting detection unit, a display panel, an operation unit, a storage unit, a control unit, and a job execution unit. The reading unit reads set document sheets one by one. The reading unit generates image data. The setting detection unit detects a document setting. The display panel displays a screen and an image. The operation unit accepts a user's operation. The storage unit stores data therein. The job execution unit executes a job. The control unit recognizes a document setting onto the reading unit on a basis of an output of the setting detection unit. Upon recognizing the document setting, the control unit controls the reading unit to execute precedent reading for reading the document set on the reading unit, the control unit controls the storage unit to store therein precedently-read image data that are image data acquired by the precedent reading. After starting of the precedent reading and when the operation unit has accepted an operation of selecting a job type to be executed by using the precedently-read image data, the control unit controls the display panel to display a setting screen corresponding to the job type selected by the operation unit. When the operation unit has accepted a job execution start instruction, the control unit controls the job execution unit to execute a job based on the precedently-read image data.

A control method for an image forming apparatus according to another aspect of the disclosure includes the steps of: reading set document sheets one by one to generate image data; displaying a screen and an image; accepting a user's operation; storing data; executing a job; recognizing a document setting onto a reading unit; upon recognition of the document setting, executing precedent reading for reading the document set on the reading unit; storing precedently-read image data that are image data acquired by the precedent reading; after a start of the precedent reading and when an operation unit has accepted an operation of selecting a job type to be executed by using the precedently-read image data, displaying a setting screen corresponding to a job type selected by the operation unit; and when the operation unit has accepted a job execution start instruction, executing a job based on the precedently-read image data.

Further features and advantages of the present disclosure will become more apparent from the description of an embodiment given below.

DETAILED DESCRIPTION

Figure 1:
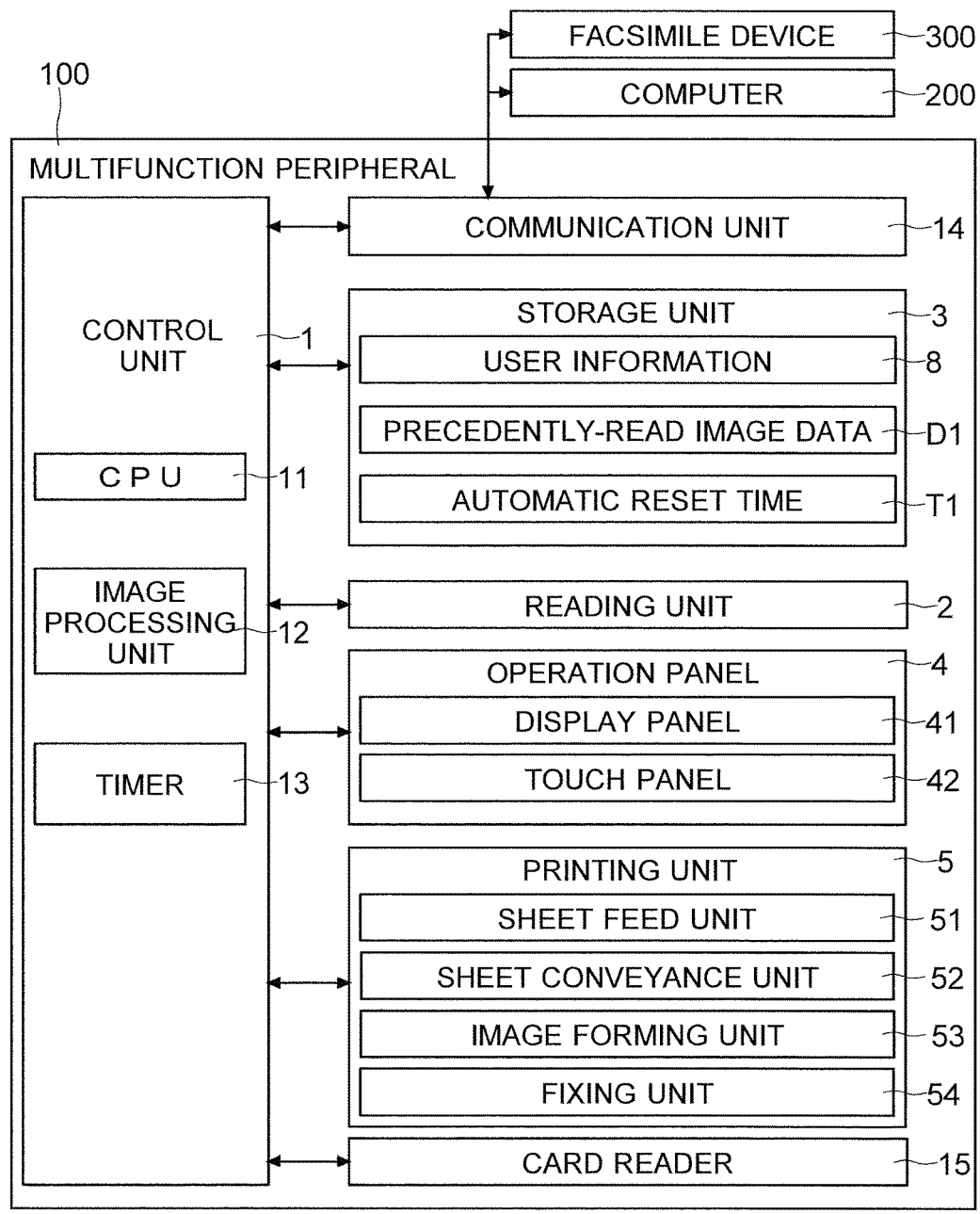
FIG. 1 is a diagram showing one example of a multifunction peripheral according to an embodiment.

Hereinbelow, an embodiment of the present disclosure will be described with reference to FIGS. 1 to 14. The following description will be given on a multifunction peripheral 100 taken as an example of the image forming apparatus. Configuration, arrangement or other component elements described in this embodiment should be construed as not limiting the scope of the disclosure but being no more than an explanatory example.

(Multifunction Peripheral 100)

An example of the multifunction peripheral 100 is explained below with reference to FIGS. 1 and 2. The multifunction peripheral 100 includes a control unit 1, a reading unit 2, a storage unit 3, an operation panel 4, a printing unit 5 (corresponding to job execution unit), a communication unit 14 (corresponding to job execution unit), and a card reader 15.

The control unit 1 controls operations of the multifunction peripheral 100. The control unit 1 includes a CPU 11 and an image processing unit 12. The storage unit 3 includes ROM, RAM, and an HDD. The storage unit 3 stores therein various types of data, and control programs. For example, the storage unit 3 stores therein control data, setting data, and image data. The CPU 11 controls individual sections and parts (reading unit 2, operation panel 4, printing unit 5, communication unit 14, and card reader 15) of the multifunction peripheral 100 based on the programs and data stored in the storage unit 3.

For processing of a job involving document reading (i.e., copy job or transmission job), the control unit 1 controls the reading unit 2 to read a document. The reading unit 2 generates image data of the document (details will be described later).

The operation panel 4 includes a display panel 41 and a touch panel 42 (corresponding to operation unit). The display panel 41 displays screens and images. The control unit 1 controls the display panel 41 to display operational images to be used for job setting. The operational images include, for example, keys and buttons. The touch panel 42 is provided on top of the display panel 41. The touch panel 42 recognizes a touch position.

Figure 2:
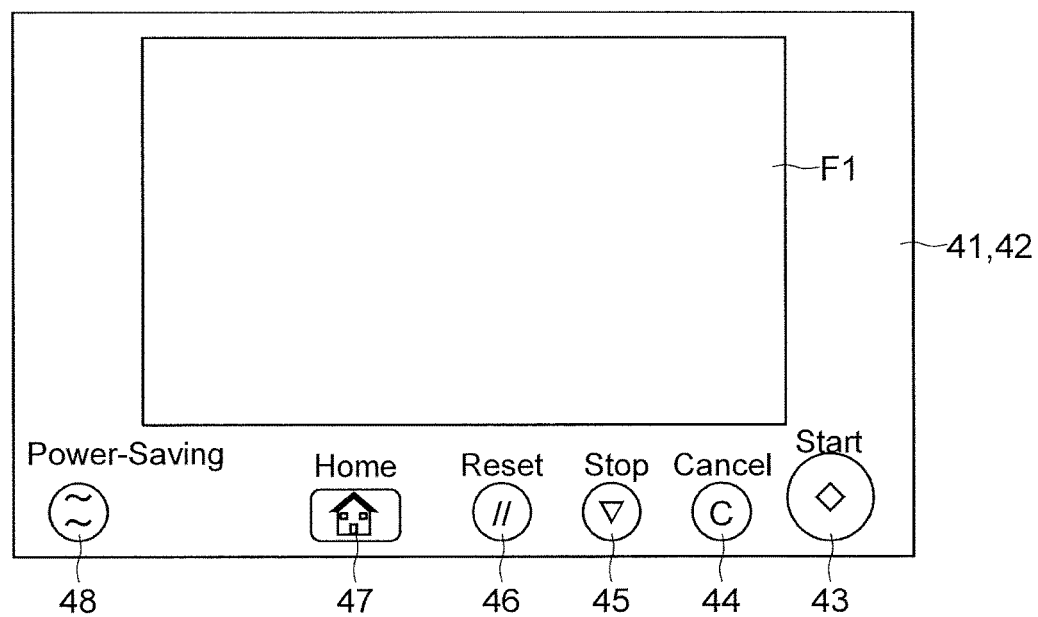
FIG. 2 is a view showing one example of an operation panel according to the embodiment.

The operation panel 4 is explained concretely with reference to FIG. 2. The control unit 1 makes a start key 43 and a cancel key 44 displayed on the display panel 41. The start key 43 is a key for issuing an instruction for a job execution start. The cancel key 44 is a key for canceling a job or settings. FIG. 2 shows an example in which displayed in addition to the start key 43 and the cancel key 44 are a stop key 45, a reset key 46, a home key 47, and a power-saving key 48. Like this, the operation panel 4 shown in FIG. 2 includes no hard keys. However, the operation panel 4 may include hard keys.

As shown in FIG. 2, a switchable display area F1 is provided in a center of the operation panel 4. The switchable display area F1 is rectangular shaped. In response to an operation by the user, a screen to be displayed in the switchable display area F1 is switched over. Operational images are included also in the screen displayed in the switchable display area F1. For example, an operational image for setting a set value is displayed. The control unit 1 recognizes an operated operational image on a basis of an output from the touch panel 42. The control unit 1 recognizes an operational content (setting content) effected by the user. The user is allowed to make job-related settings on the operation panel 4. The operation panel 4 accepts a user's operation.

The printing unit 5 includes a sheet feed unit 51, a sheet conveyance unit 52, an image forming unit 53, and a fixing unit 54. For printing, the control unit 1 controls the sheet feed unit 51 to feed a paper sheet. The control unit 1 controls the sheet conveyance unit 52 to convey the sheet. The control unit 1 controls the image forming unit 53 to form a toner image based on image data. The control unit 1 controls the image forming unit 53 to transfer the toner image to the sheet that is under conveyance. The control unit 1 controls the fixing unit 54 to fix the toner image transferred onto the sheet. The control unit 1 controls the sheet conveyance unit 52 and the fixing unit 54 to discharge the after-fixation sheet out of the apparatus.

The communication unit 14 communicates with a computer 200 or a facsimile device 300. The computer 200 is a PC or a server as an example. The communication unit 14 includes a connector, a communication-use circuit, and communication-use memory. The communication unit 14 receives print data transmitted from the computer 200 or the facsimile device 300. The print data includes image data or data described in a page description language. The control unit 1 controls the printing unit 5 to perform printing based on the received print data (print job). The communication unit 14 is enabled to transmit image data to the computer 200 or the facsimile device 300 (transmission job).

The card reader 15 is a device for reading an ID card having user information 8 stored therein. The card reader 15 reads the user information 8 from the ID card which is set on or held above the card reader 15. Details of authentication based on the user information 8 will be described later.

(Configuration of Reading Unit 2)

Figure 3:
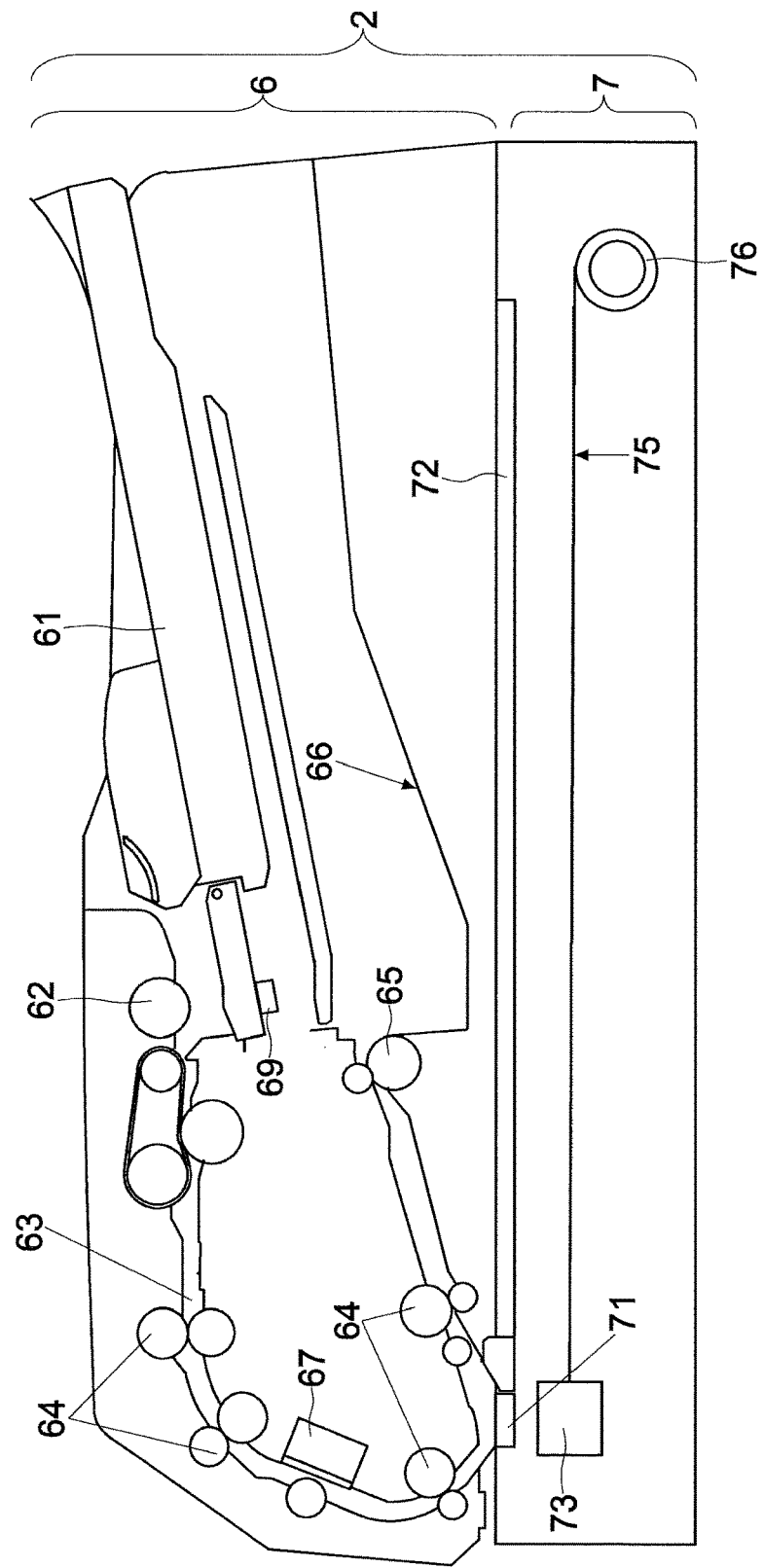
FIG. 3 is a view showing one example of a reading unit according to the embodiment.
Figure 4:
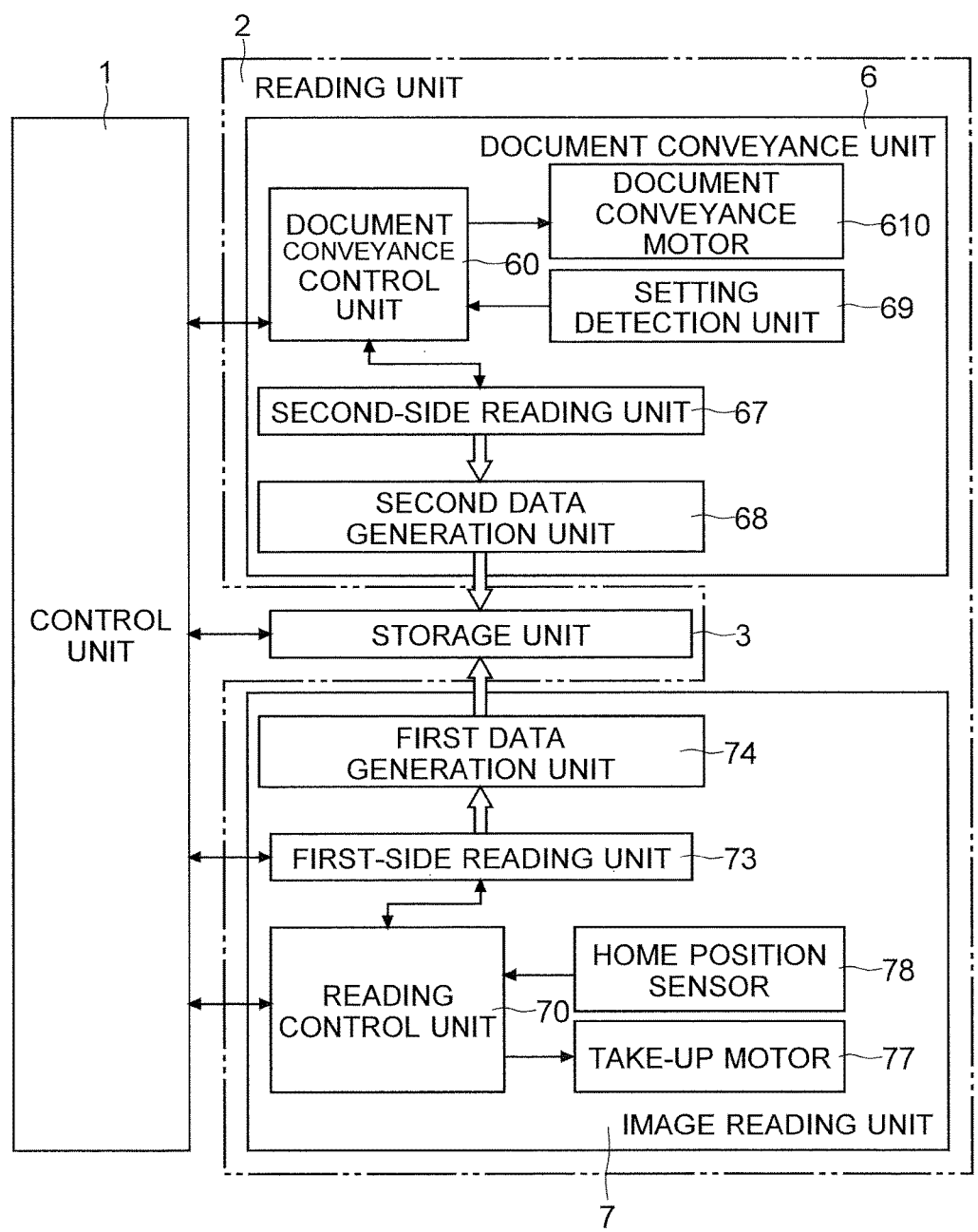
FIG. 4 is a diagram showing one example of the reading unit according to the embodiment.

Next, the reading unit 2 according to this embodiment is explained with reference to FIGS. 3 and 4. The reading unit 2 is provided in upper part of the multifunction peripheral 100. The reading unit 2 includes a document conveyance unit 6 and an image reading unit 7. As shown in FIG. 3, the document conveyance unit 6 is provided upward of the image reading unit 7. The document conveyance unit 6 is opened and closed, upward and downward, relative to the image reading unit 7.

The image reading unit 7 includes an under-conveyance reading-use contact glass 71 and a at-rest reading-use contact glass 72. More specifically, the under-conveyance reading-use contact glass 71 is provided on an upper-surface left side of the image reading unit 7. The at-rest reading-use contact glass 72 is placed on the right side of the under-conveyance reading-use contact glass 71 on the upper surface of the image reading unit 7. The image reading unit 7 applies light to a document that is being conveyed by the document conveyance unit 6 to pass through the under-conveyance reading-use contact glass 71 or that has been set (rested) on the at-rest reading-use contact glass 72. The image reading unit 7 reads the document on a basis of light reflected by the document. The image reading unit 7 generates image data of the document.

The document conveyance unit 6 includes, as mentioned in descending order from upstream side of the document conveyance direction, a document tray 61, a document feed roller 62, a document conveyance path 63, a plurality of document conveyance roller pairs 64, a document discharge roller pair 65, and a document discharge tray 66. The document conveyance unit 6 functions as a cover that presses the contact glasses of the image reading unit 7 from above.

For reading of a document, the document feed roller 62 feeds out document sheets one by one onto the document conveyance path 63. A document sheet derived from the document tray 61 is conveyed to the plural document conveyance roller pairs 64 as well as guides. The document sheet passes through on the upper side of the under-conveyance reading-use contact glass 71. During this passage, a first-side reading unit 73 provided in the image reading unit 7 reads one side (front surface) of the document sheet. The first-side reading unit 73 includes a light source, a lens and an image sensor. Also, the image reading unit 7 includes a first data generation unit 74. The first data generation unit 74 includes an A/D conversion circuit. The first data generation unit 74 generates first-side image data based on an analog output signal of the image sensor in the first-side reading unit 73. The storage unit 3 stores the image data generated by the first data generation unit 74.

Also, a second-side reading unit 67 is provided at a point on the document conveyance path 63. The second-side reading unit 67 is fixed (immobilized) in the document conveyance unit 6. The second-side reading unit 67 includes a light source, a lens and an image sensor. Further, a second data generation unit 68 is provided in the document conveyance unit 6. The second data generation unit 68 includes an A/D conversion circuit. The second data generation unit 68 generates other-side (back-surface) image data based on an analog output signal of the image sensor in the second-side reading unit 67. The storage unit 3 stores the image data generated by the second data generation unit 68. The first-side reading unit 73 and the second-side reading unit 67 make it possible to read top and back sides of the document sheet in the course of one-time conveyance. The document sheet is discharged from the document discharge roller pair 65 to the document discharge tray 66.

As shown in FIG. 3, the image reading unit 7 includes, in its housing, the first-side reading unit 73, a wire 75, and a take-up drum 76. The first-side reading unit 73 is connected to the take-up drum 76 by the wire 75. The take-up drum 76 is rotated by a take-up motor 77 (see FIG. 4) which rotates forward and reverse. This makes it possible to move the first-side reading unit 73 horizontally (in a sub-scanning direction). For reading of the document sheet on the at-rest reading-use contact glass 72, the first-side reading unit 73 is moved horizontally to fulfill the reading. For reading of the document sheet being conveyed by the document conveyance unit 6, on the other hand, the first-side reading unit 73 is immobilized below the under-conveyance reading-use contact glass 71.

The document conveyance unit 6 includes a document conveyance control unit 60. The document conveyance control unit 60 controls operations of the document conveyance unit 6. The document conveyance control unit 60 is communicatably connected to the control unit 1 and a reading control unit 70. The document conveyance control unit 60 is a PC board containing a CPU, ROM and RAM. The control unit 1 and the reading control unit 70 give the document conveyance control unit 60 an instruction for document conveyance start. Based on this instruction, the document conveyance control unit 60 controls the document conveyance.

A setting detection unit 69 is provided in the document conveyance unit 6. The setting detection unit 69 is a sensor for detecting whether or not a document sheet is present on the document tray 61. The setting detection unit 69 is an optical sensor as an example. The document conveyance control unit 60 recognizes whether or not a sheet is present on the document tray 61 based on a output of the setting detection unit 69. Further, the document conveyance control unit 60 notifies the control unit 1 and the reading control unit 70 of presence or absence of a document sheet. Based on this notification, the control unit 1 and the reading control unit 70 recognize whether or not a document has been set. For reading of a document set on the document tray 61, the document conveyance control unit 60 drives a document conveyance motor 610. Then, the document feed roller 62 and the document conveyance roller pairs 64 are rotated. The document sheet is conveyed toward a reading position.

The reading control unit 70 for controlling operations of the image reading unit 7 is provided in the image reading unit 7. The reading control unit 70, receiving instructions and signals from the control unit 1, controls reading of the document. The reading control unit 70 is a PC board containing a CPU and memory. The reading control unit 70 is connected to the take-up motor 77. The reading control unit 70 controls rotations of the take-up motor 77. The take-up motor 77 is a pulse motor as an example. The reading control unit 70 makes the take-up drum 76 rotated. Then, the first-side reading unit 73 is moved horizontally (in the sub-scanning direction). The reading control unit 70 controls the take-up motor 77. The reading control unit 70 moves the first-side reading unit 73 to a moving extent necessary for reading. The reading control unit 70 controls movement of the first-side reading unit 73.

The reading control unit 70 is connected to a home position sensor 78. The home position sensor 78 is a sensor for detecting that the first-side reading unit 73 has arrived at the home position. The reading control unit 70 controls the take-up motor 77 to return the first-side reading unit 73 to the home position upon completion of the document reading. The home position is located below a point between the at-rest reading-use contact glass 72 and the under-conveyance reading-use contact glass 71.

(User Registration and User Authentication)

Next, an example of user registration and user authentication in the multifunction peripheral 100 according to this embodiment is explained with reference to FIG. 1. The multifunction peripheral 100 has an authentication function. The authentication function is a function of managing and identifying a user or users of the multifunction peripheral 100. The operation panel 4 accepts a setting as to whether or not the authentication function is used. A user is enabled to select whether or not the authentication function is used.

With use of the authentication function selected, only permitted users are enabled to use the multifunction peripheral 100. With nonuse of the authentication function selected, everyone is enabled to use the multifunction peripheral 100.

The control unit 1 confirms whether or not user information 8 inputted to the multifunction peripheral 100 agrees with user information 8 previously registered in the storage unit 3. The control unit 1 authenticates a user corresponding to the agreed user information 8 as a user of the multifunction peripheral 100. With the agreement of user information, the control unit 1 admits a log-in of the user. With the log-in admitted, the control unit 1 switches the operation panel 4 from log-out to log-in state. The log-in state is a state in which the operation panel 4 is operation-acceptable. The user is allowed to fulfill job settings and an instruction for job execution start by the operation panel 4. More specifically, in the log-in state, the user is enabled to fulfill job-related settings such as copy and transmission or an instruction for job execution start. When an instruction for job execution start is issued in the log-in state (when the start key 43 is operated), the control unit 1 makes the job started.

Without the agreement of user information, the control unit 1 admits no log-in. With the log-in unadmitted, the control unit 1 holds the operation panel 4 in a log-out state. In the log-out state, the control unit 1 prohibits the operation panel 4 from accepting any operation by the user except for entry of the user information 8. The operation panel 4 accepts neither job settings nor instructions for job execution start. In the log-out state, the control unit 1 prohibits the display panel 41 from displaying any job-related setting screen. Therefore, it is impossible to perform job-related settings in the log-out state. Also in the log-out state, the control unit 1 blocks the job execution unit from starting a job even when an instruction for job execution start is issued to the operation panel 4.

For user authentication, the user information 8 is previously registered (stored) in the storage unit 3. A user can be registered by operating the operation panel 4. For example, an administrator of the multifunction peripheral 100 performs a user registration operation. The registered user information 8 is stored in the storage unit 3 (see FIG. 1). For example, when a specified operation is performed on the operation panel 4, the control unit 1 controls the display panel 41 to display a software keyboard screen therein. The administrator fills inputs into individual items of the user information 8 by using the software keyboard. Input items per user include user name, log-in password, log-in user name, assigned division, access level, various types of addresses, and the like. For each one of users permitted for use of the multifunction peripheral 100, inputs are filled in the individual items. The control unit 1 authenticates a user by using the user information 8 stored in the storage unit 3.

With the authentication function selected, using the multifunction peripheral 100 involves getting authentication. For getting authentication (i.e., getting log-in), the user information 8 needs to be inputted in the operation panel 4. In the case of the multifunction peripheral 100, input of the log-in user name and the password is demanded. Input of other types of information may also be demanded. The user operates the software keyboard screen displayed on the operation panel 4. The touch panel 42 accepts inputs of the log-in user name and the password. On a basis of an output of the touch panel 42, the control unit 1 recognizes the log-in user name and the password that have been inputted.

The control unit 1 verifies the inputted user information 8 (log-in user name and password) against the user information 8 stored in the storage unit 3. More specifically, the control unit 1 searches the user information 8 stored in the storage unit 3 for a user matching the inputted log-in user name and password. The control unit 1 authenticates a matching user as a user of the multifunction peripheral 100. The control unit 1 sets the operation panel 4 into a log-in state. With no matching user found, the control unit 1 maintains the operation panel 4 in the log-out state.

In addition, the control unit 1 may automatically set the operation panel 4 into a log-out state (automatic log-out). For example, upon completion of a job, or after a lapse of specified time since the last operation on the operation panel 4, the control unit 1 automatically sets the operation panel 4 into a log-out state.

The user authentication may also be executed with use of an ID card. In this case, each user possesses an ID card. The user's ID card has stored therein user's own user information 8. A user desiring to use the multifunction peripheral 100 lets the card reader 15 read the ID card. The card reader 15 reads out user information 8 stored in the ID card. The control unit 1 searches the user information 8 stored in the storage unit 3 for a user matching the user information 8 read out by the card reader 15. The control unit 1 authenticates a matching user as a user of the multifunction peripheral 100. The control unit 1 sets the operation panel 4 into a log-in state. With no matching user found, the control unit 1 maintains the operation panel 4 in the log-out state.

(Selection of Reading Mode)

Figure 5:
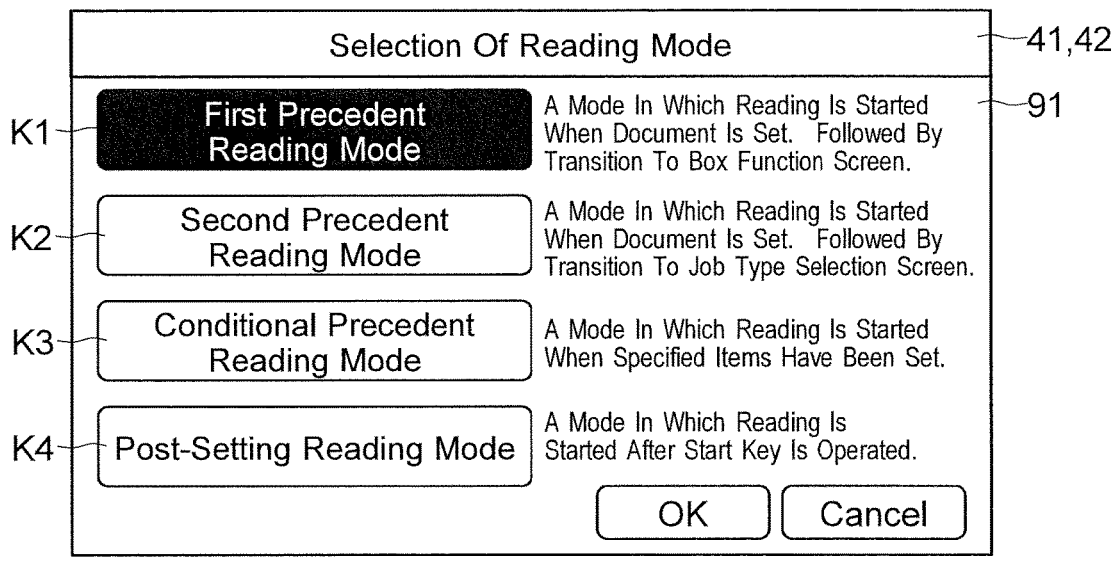
FIG. 5 is a view showing one example of a reading mode selection screen according to the embodiment.

Next, an example of selection among reading modes in the multifunction peripheral 100 according to this embodiment is explained with reference to FIG. 5. The multifunction peripheral 100 has four modes related to document reading, i.e., first precedent reading mode, second precedent reading mode, conditional precedent reading mode, and post-setting reading mode.

The first precedent reading mode and the second precedent reading mode are a mode in which document reading is started when the document is set on the document tray 61. The conditional precedent reading mode is a mode in which document reading is started when set values for predetermined necessary items are set. The post-setting reading mode is a mode in which document reading is started when the start key 43 is operated.

The necessary items are previously determined. The necessary items are items necessary for generation of image data of a document. For example, the necessary items are document type, exposure intensity, resolution, and reading scale factor. Items other than these four items may be assigned as necessary items. Set values settable for the item of document type are character, photograph, and mixed character-and-photograph. The control unit 1 makes different types of image processing applied to image data of the document depending on set values that have been set for the item of document type. For the item of exposure intensity, a light-quantity level to be applied to the document may be selected as a set value. The control unit 1 makes the lamps of the first-side reading unit 73 and the second-side reading unit 67 lit up depending on a set light-quantity level. For the item of resolution, a resolution of image data may be selected as a set value. The control unit 1 controls the image processing unit 12 to generate image data of a selected resolution. For the item of reading scale factor, a scale factor may be selected as a set value. The control unit 1 controls the image processing unit 12 to generate image data of a selected scale factor.

The post-setting reading mode corresponds to reading performed in conventional image forming apparatuses. After having completed all of necessary settings, the user operates the start key 43. When recognizing the operation of the start key 43, the control unit 1 controls the reading unit 2 to execute document reading.

When a specified operation is performed on the operation panel 4, the control unit 1 controls the display panel 41 to display a reading mode selection screen 91. The reading mode selection screen 91 includes a first precedent reading mode selection key K1, a second precedent reading mode selection key K2, a conditional precedent reading mode selection key K3, and a post-setting reading mode selection key K4. The user operates a selection key corresponding to a desired mode. FIG. 5 shows a state in which the first precedent reading mode has been selected. The operation panel 4 accepts a selection of a document reading mode. The control unit 1 controls the reading unit 2 to read the document in a selected mode.

(Reading in Precedent Reading Modes)

Figure 6:
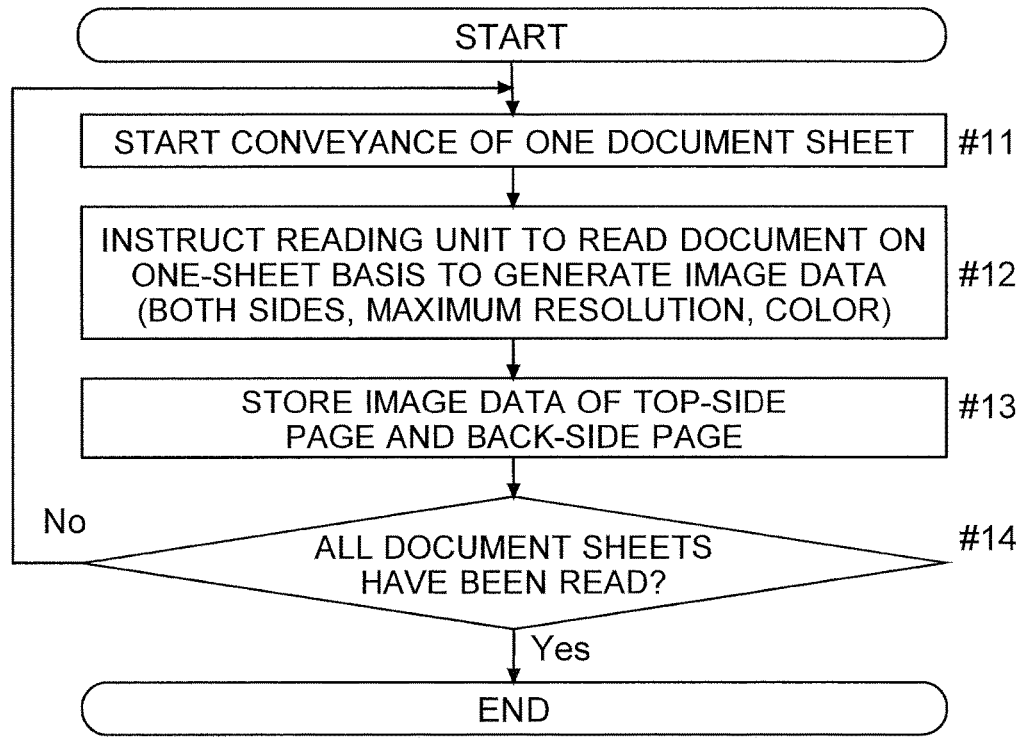
FIG. 6 is a flowchart showing one example of a reading flow in each precedent reading mode according to the embodiment.

Next, an example of a reading flow in each precedent reading mode according to this embodiment is explained with reference to FIG. 6. A start in FIG. 6 is at a time point when the control unit 1 recognizes a document setting onto the document tray 61 on a basis of an output of the setting detection unit 69.

First, the control unit 1 controls the reading unit 2 to start conveyance of one document sheet (step #11). With nonuse of the authentication function selected, the control unit 1, upon recognizing a document setting onto the document conveyance unit 6, controls the reading unit 2 to start document reading. With use of the authentication function selected, when having recognized a document setting onto the document conveyance unit 6 under a user-authenticated state (log-in state), the control unit 1 controls the reading unit 2 to start the document reading. With the use of the authentication function selected, the control unit 1, when having authenticated a user under a user-unauthenticated state (log-out state), controls the reading unit 2 to start the document reading.

The control unit 1 controls the reading unit 2 to read one document sheet and generate image data (step #12). At a time point of precedent reading, it is indefinite which is used for a job, both sides or one side of document sheets. Therefore, the control unit 1 controls the reading unit 2 to read both sides of the set document sheet. Then, the control unit 1 controls the reading unit 2 to generate image data of both sides of the document sheet as precedently-read image data D1. Also, at a time point of precedent reading, the resolution of image data to be used for the job is indefinite. Accordingly, the control unit 1 controls the reading unit 2 to read both sides of the set document sheet with a maximum resolution. Then, the control unit 1 controls the reading unit 2 to generate maximum-resolution image data of both sides of the document sheet as precedently-read image data D1. Also, at a time point of precedent reading, it is indefinite which is used for the job, color image data or monochrome image data. Accordingly, the control unit 1 controls the reading unit 2 to read both sides of the set document sheet in color. Then, the control unit 1 controls the reading unit 2 to generate color image data of both sides of the document sheet as precedently-read image data D1.

The control unit 1 controls the storage unit 3 to store image data (precedently-read image data D1) of two pages, i.e. top-side (one side) and back-side (other side) pages, generated by the reading unit 2 (step #13, see FIG. 1). Then, the control unit 1 confirms whether or not reading of all the document sheets has been completed (step #14). More specifically, the control unit 1 confirms whether or not the setting detection unit 69 has detected an absence of any document sheet. When the setting detection unit 69 has detected an absence of any document sheet, the control unit 1 decides that reading of all the document sheets has been completed. When the setting detection unit 69 has detected a presence of any document sheet, the control unit 1 decides that reading of all the document sheets is uncompleted.

When reading of all the document sheets has been completed (Yes at step #14), this flow is ended (END). When reading of all the document sheets is uncompleted (No at step #14), the flow returns to step #11.

(Operation in First Precedent Reading Mode)

Next, an example of a processing flow in the first precedent reading mode according to this embodiment is explained with reference to FIGS. 7 to 10. The multifunction peripheral 100 has a box function. The box function is a function of utilizing image data stored in the storage unit 3. Executable jobs include printing, transmission, and facsimile transmission. Other types of processing may be executable. When precedent reading is done in the first precedent reading mode, the control unit 1 makes a box function-related screen displayed. The user is enabled to fulfill job settings with such a feeling as using the box function.

Figure 7:
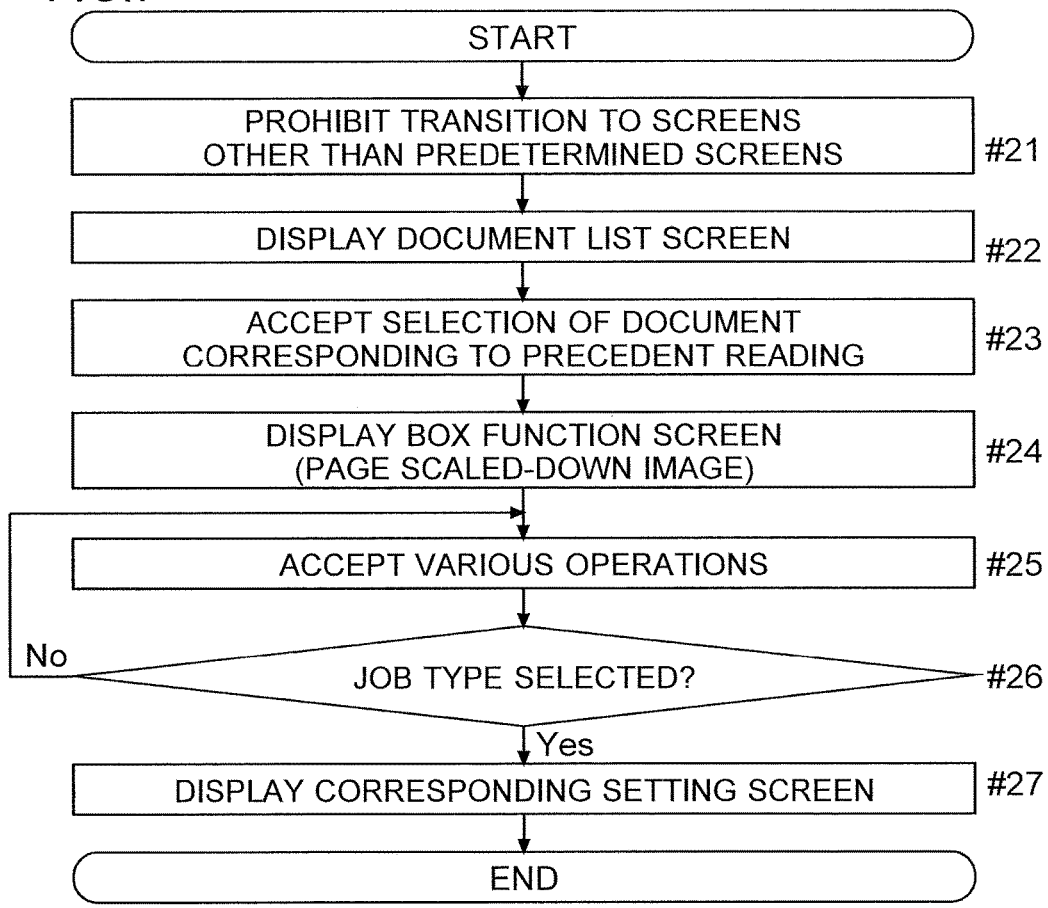
FIG. 7 is a flowchart showing one example of an operation flow in a first precedent reading mode according to the embodiment.

A start in FIG. 7 is at a time point when precedent reading in the first precedent reading mode is started. First, the control unit 1 prohibits transitions to screens other than predetermined screens (step #21). The predetermined screens include a document list screen 92, a box function screen 93, and a setting screen for a job using the precedently-read image data D1. The control unit 1 restricts operations unrelated to a job using the precedently-read image data D1. For example, a transition to a system-related setting screen (system menu screen) is prohibited.

Figure 8:
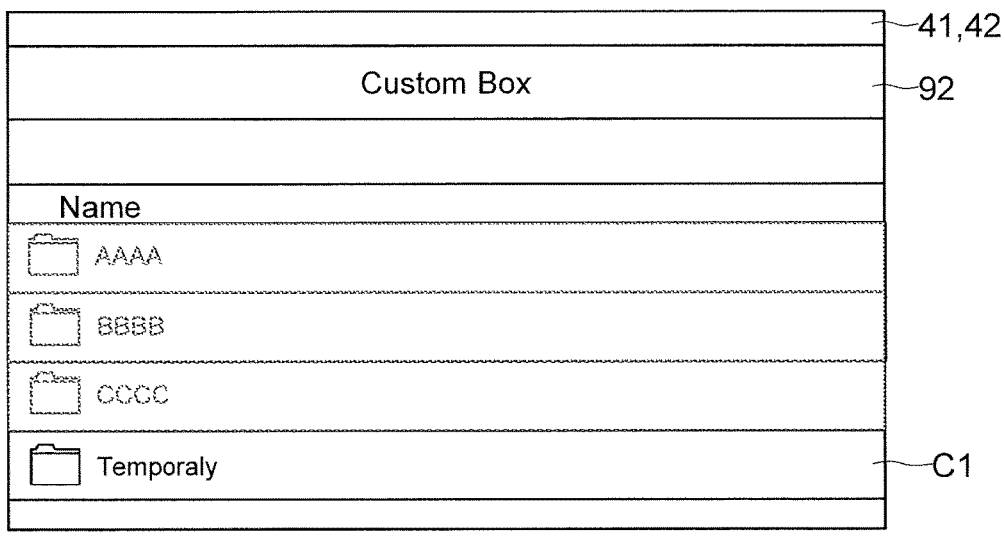
FIG. 8 is a view showing one example of a document list screen according to the embodiment.

The control unit 1 controls the display panel 41 to display the document list screen 92 (step #22). The document list screen 92 is displayed in the switchable display area F1. FIG. 8 shows an example of the document list screen 92. The document list screen 92 is a screen for selecting a document to be used for a job. In the document list screen 92, selection fields corresponding to documents stored in the storage unit 3, respectively, are displayed. Document names are included in the selection fields. Scrolling by flick operation allows other selection fields for other documents to be displayed. In addition, with use of the authentication function selected, the control unit 1 makes an instruction for displaying selection fields for documents usable for an authenticated user (logged-in user) in the document list screen 92. For selecting a document to be used for a job, the user operates (touches) a selection field. The control unit 1 recognizes a document corresponding to the operated selection field as a selected document.

As shown in FIG. 8, when having executed the precedent reading, the control unit 1 automatically adds a temporary document selection field C1 in the document list screen 92. The temporary document selection field C1 corresponds to image data (precedently-read image data D1) generated by precedent reading.

When the precedent reading has been executed, no documents except a temporary document are selectable in the document list screen 92. This is intended to restrict operations unrelated to a job using the precedently-read image data D1. FIG. 8 shows an example of display in which the control unit 1 has grayed out selection fields for documents other than the temporary document. Otherwise, the control unit 1 may suppress display of the selection fields for documents other than the temporary document in the display panel 41.

In addition, in an ordinary state with use of the box function, the control unit 1 makes the document list screen 92 displayed in the display panel 41. That is, when an operation of using the box function is performed on the operation panel 4 without applying precedent reading, the control unit 1 makes the document list screen 92 displayed in the display panel 41. With ordinary use of the box function, any document can arbitrarily be selected.

Figure 9:
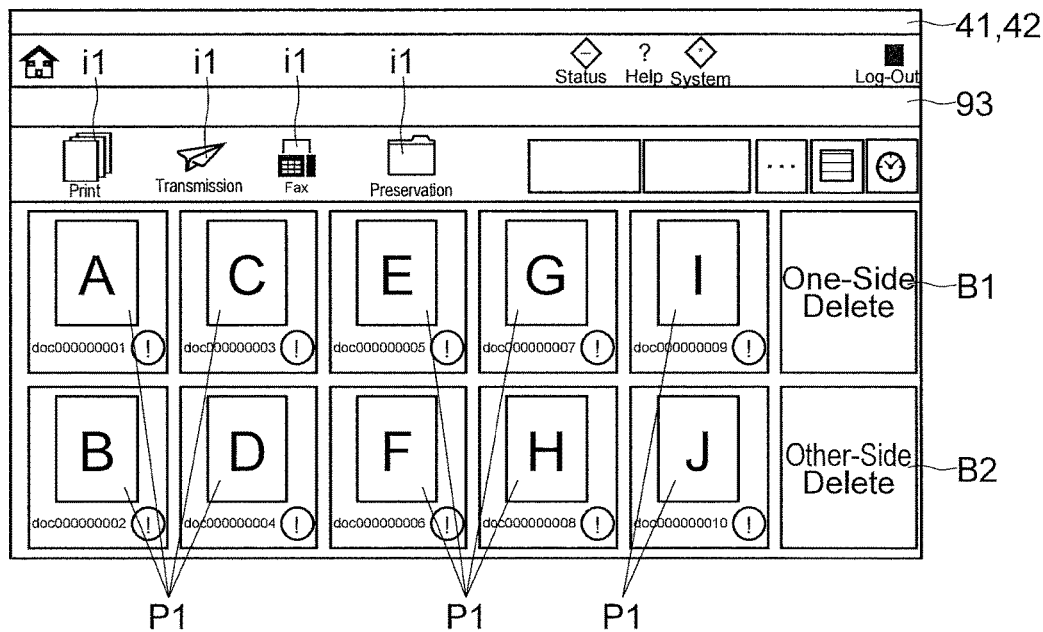
FIG. 9 is a view showing one example of a box function screen according to the embodiment.

As a result, the operation panel 4 accepts a selection of a document (temporary document selection field C1) corresponding to the precedent reading (step #23). Then, the control unit 1 makes the box function screen 93 displayed in the display panel 41 (step #24). The box function screen 93 is displayed also in the switchable display area F1 FIG. 9 shows an example of the box function screen 93. The operation panel 4 accepts various operations on the box function screen 93 (step #25).

The control unit 1 makes one- or plural-page images P1 displayed in the box function screen 93. The page images P1 are images obtained by scaling down pages contained in the precedently-read image data D1 (selected document). The control unit 1 (image processing unit 12) scales down image data of individual pages contained in the precedently-read image data D1. The control unit 1 generates scaled-down image data of the individual pages. Based on the scaled-down image data of the individual pages, the control unit 1 makes the page images P1 displayed.

The control unit 1 makes the page images P1 displayed in an array of upper-and-lower two rows. The control unit 1 makes page images P1 of one-side (top) pages of a document displayed in the upper row. The control unit 1 makes page images P1 of other-side (back) pages of the document displayed in the lower row. The control unit 1 makes a page image P1 of the n-th page of the document displayed in the n-th column, as counted from the leftmost column. For example, scaled-down image data in the leftmost column correspond to page images P1 of the first sheet of the document.

FIG. 9 shows an example in which page images P1 corresponding to five document sheets (ten pages) of the document are displayed. With the number of document sheets larger than a displayable number, it may be arranged that page images P1 of other pages are displayed by left-and-right flick operations.

In this connection, unnecessary sheets may unexpectedly be included in a document bundle. Therefore, the operation panel 4 accepts an operation of selecting among page images P1. In other words, the operation panel 4 accepts an operation of excluding unnecessary pages.

FIG. 9 shows a state in which all the pages have been selected. Touching a page image P1 allows its page to be switched between selected and unselected state. The control unit 1 makes a mark displayed (marked) nearby the page image P1 of each selected page. In the example of FIG. 9, an exclamation-marked circle is used as the mark. The control unit 1 suppresses the display of the mark (adds no mark) for unselected pages. The control unit 1 controls the job execution unit to execute the job on a basis of image data of pages corresponding to selected page images P1 out of the precedently-read image data D1.

During precedent reading process, both sides of document sheets are read. However, both sides of the document sheets are not necessarily used for execution of the job. For example, back-side sheets may be used for printing with an intention of paper-resource saving. The term, back-side sheet, refers to a sheet having one side already printed and the other side blank. With back-side sheets given as a document, there are some cases where executing the job with only one side of the document sheets is desired.

Accordingly, a one-side delete button B1 and an other-side delete button B2 are provided in the box function screen 93. When the one-side delete button B1 is operated, the control unit 1 controls the storage unit 3 to delete image data of one side (top surface) of the document sheets out of the precedently-read image data D1. Also, when the other-side delete button B2 is operated, the control unit 1 controls the storage unit 3 to delete image data of the other side (back surface) of the document sheets out of the precedently-read image data D1. As a result of this, image data of an unnecessary side can be deleted collectively.

Next, the control unit 1 succeedingly confirms whether or not a job type has been selected (step #26; No at step #26→step #25). When a job type has been selected (Yes at step #26), the control unit 1 controls the display panel 41 to display a job setting screen corresponding to the selected job type (operated type selection image i1) (step #27→END). Details of the processing flow subsequent to the display of the job setting screen will be described later.

As shown in FIG. 9, the control unit 1 makes type selection images i1 displayed in the box function screen 93. The type selection images i1 are images for selecting a job type to be executed by using the precedently-read image data D1. FIG. 9 shows an example in which four icons of print icon, transmission icon, facsimile icon, and preservation icon are displayed as the type selection images i1.

Figure 10:
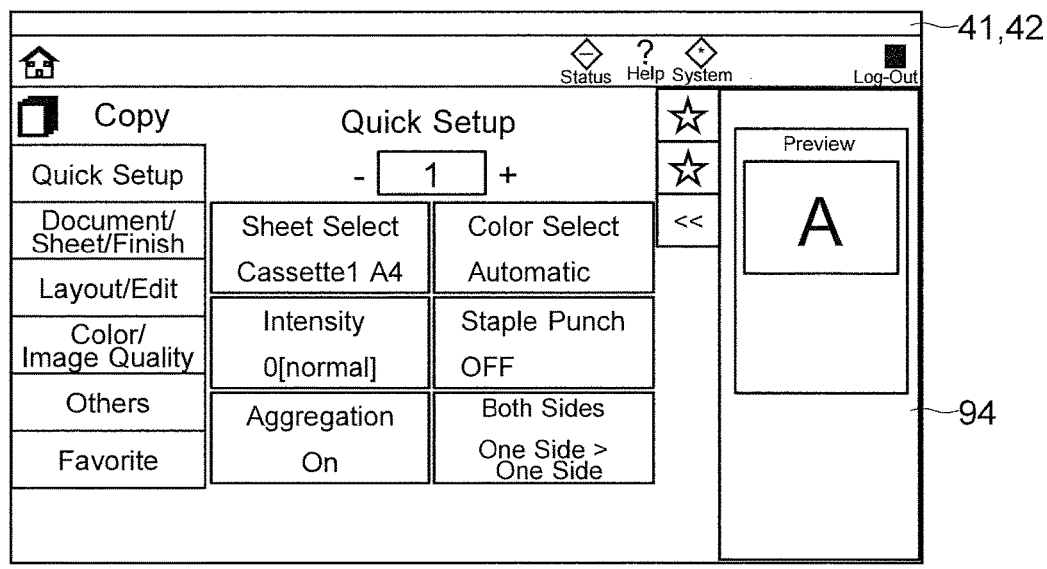
FIG. 10 is a view showing one example of a print job setting screen according to the embodiment.

When the print icon is operated, the control unit 1 recognizes that the print job has been selected. With the print job set, the control unit 1 controls the display panel 41 to display a setting screen 94 corresponding to the print job. FIG. 10 shows an example of the setting screen 94 corresponding to the print job. Printing of the precedently-read image data D1 is copying of the document. Therefore, FIG. 10 is a screen similar to a setting screen for copy.

When the transmission icon is operated, the control unit 1 recognizes that the transmission job has been selected. With the transmission job set, the control unit 1 controls the display panel 41 to display a setting screen corresponding to the transmission job. Depiction of a setting screen corresponding to the transmission job is omitted. When the facsimile icon is operated, the control unit 1 recognizes that the facsimile transmission job has been selected. With the facsimile transmission job set, the control unit 1 controls the display panel 41 to display a setting screen corresponding to the facsimile transmission job. Depiction of a setting screen corresponding to the facsimile transmission job is omitted.

Further, when the preservation icon is operated, the control unit 1 recognizes that the preservation job has been selected. With the preservation job set, the control unit 1 controls the display panel 41 to display a setting screen corresponding to the preservation job. Depiction of a setting screen corresponding to the preservation job is omitted.

(Operations in Second Precedent Reading Mode)

Figure 11:
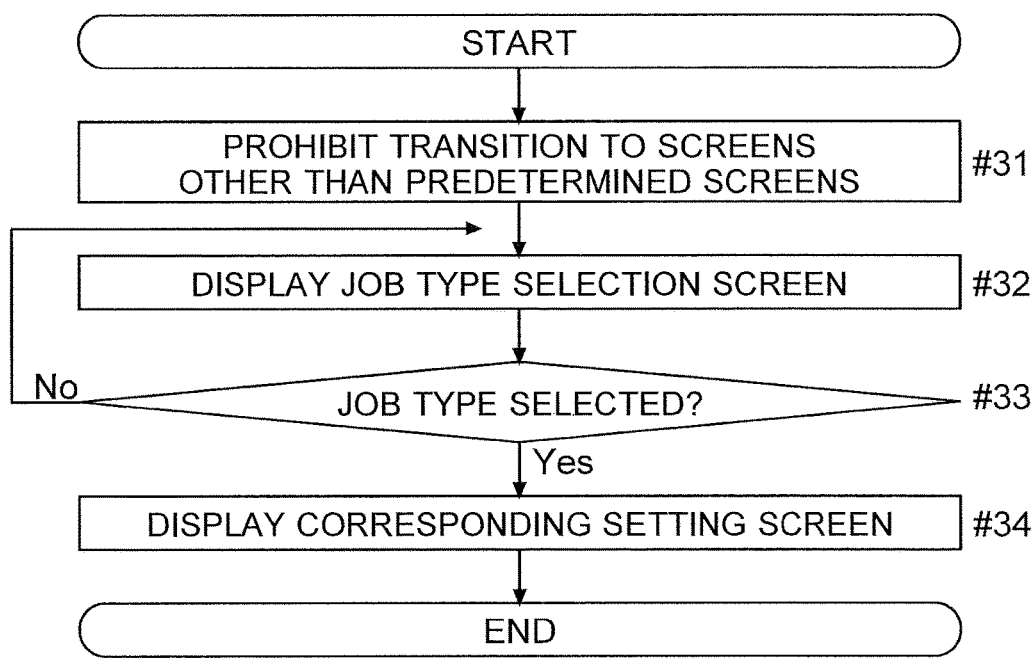
FIG. 11 is a flowchart showing one example of an operation flow in a second precedent reading mode according to the embodiment.

Next, an example of a processing flow in the second precedent reading mode according to this embodiment is explained with reference to FIGS. 11 and 12. A start in FIG. 11 is at a time point when precedent reading in the second precedent reading mode is started. Also in the second precedent reading mode, the control unit 1 prohibits transitions to screens other than predetermined screens (step #31). The predetermined screens are a job type selection screen 95, and a setting screen for a job using the precedently-read image data D1.

Next, the control unit 1 makes a job type selection screen 95 displayed (step #32). The job type selection screen 95 is displayed in the switchable display area F1. FIG. 12 shows an example of the job type selection screen 95. The control unit 1 succeedingly confirms whether or not a job type has been selected (step #33; No at step #33→step #32). When a job type is selected (Yes at step #33), the control unit 1 controls the display panel 41 to display a job setting screen corresponding to the selected job type (operated type selection image i1) (step #34→END). Details of the processing flow subsequent to the display of the job setting screen will be described later.

Figure 12:
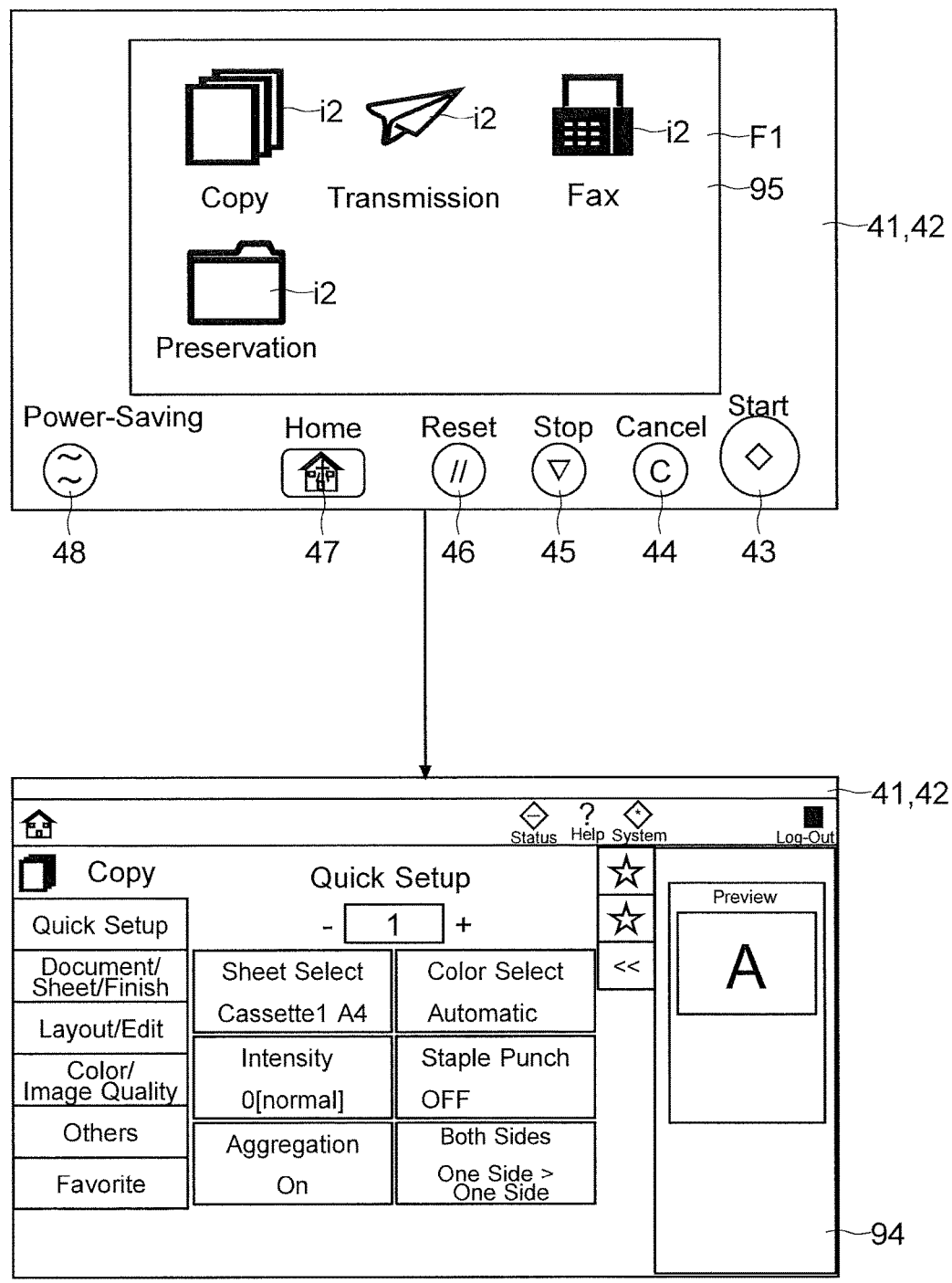
FIG. 12 is a view showing one example of a job type selection screen according to the embodiment.

As shown in an upper view of FIG. 12, the control unit 1 makes type selection images i2 displayed in the job type selection screen 95. The type selection images i2 are images for selecting a job type to be executed by using the precedently-read image data D1. FIG. 12 shows an example in which four icons of print icon, transmission icon, facsimile icon, and preservation icon are displayed as the type selection images i2. In the example of FIG. 12, images similar to the type selection images i1 in the box function screen 93 are displayed. The type selection images i2 in the job type selection screen 95 may be made different from the type selection images i1 displayed in the box function screen 93.

When the print icon is operated, the control unit 1 recognizes that the print job has been selected. With the print job set, the control unit 1 controls the display panel 41 to display a setting screen 94 corresponding to the print job. The lower view of FIG. 12 shows an example of the setting screen 94 corresponding to the print job. Printing of the precedently-read image data D1 is copying of the document. Therefore, the lower view of FIG. 12 is a screen similar to the setting screen for copy.

Also, when the transmission icon is operated, the control unit 1 recognizes that the transmission job has been selected. With the transmission job set, the control unit 1 controls the display panel 41 to display a setting screen corresponding to the transmission job. Depiction of a setting screen corresponding to the transmission job is omitted. When the facsimile icon is operated, the control unit 1 recognizes that the facsimile transmission job has been selected. With the facsimile transmission job set, the control unit 1 controls the display panel 41 to display a setting screen corresponding to the facsimile transmission job. Depiction of a setting screen corresponding to the facsimile transmission job is omitted. When the preservation icon is operated, the control unit 1 recognizes that the preservation job has been selected. With the preservation job set, the control unit 1 controls the display panel 41 to display a setting screen corresponding to the preservation job. Depiction of a setting screen corresponding to the preservation job is omitted.

In the flowchart of the second precedent reading mode, steps #22 to #25 are skipped out of the flowchart of the first precedent reading mode. Therefore, the second precedent reading mode can be regarded as a mode in which the display of the box function-related screen in the first precedent reading mode is skipped.

(Setting in Each Precedent Reading Mode)

Figure 13:
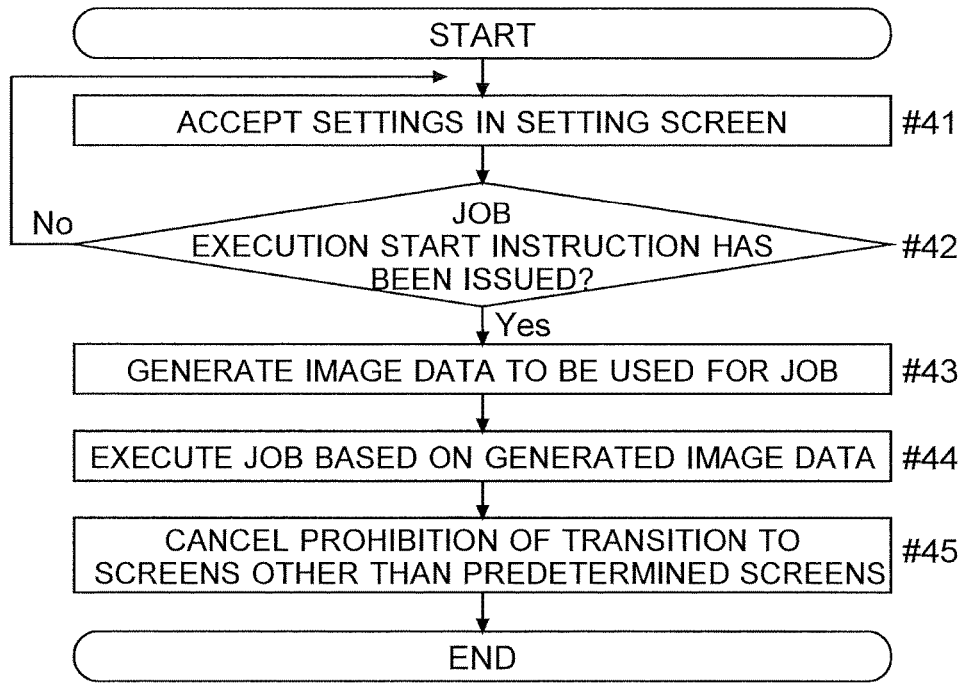
FIG. 13 is a flowchart showing one example of a setting flow in each precedent reading mode in the multifunction peripheral according to the embodiment.

Next, an example of a setting flow in each precedent reading mode with the multifunction peripheral 100 according to this embodiment is explained with reference to FIG. 13. A start in FIG. 13 is at a time point when a job setting screen corresponding to a selected job type is displayed on the display panel 41 by operation of a type selection image i1 or a type selection image i2.

First, the operation panel 4 accepts settings in the setting screen (step #41). When the print job is selected, the operation panel 4 accepts settings related to printing. When the transmission job is selected, the operation panel 4 accepts settings related to transmission. When the facsimile transmission job is selected, the operation panel 4 accepts settings related to facsimile transmission. When the preservation job is selected, the operation panel 4 accepts settings related to document preservation. In each job setting screen, for example, set values for destination address and sheet size can be set. A resolution of image data to be used for the job can also be set. It can also be set whether color image data or monochrome image data is used for the job.

The control unit 1 confirms whether a job execution start instruction has been issued (step #42; No at step #42→step #41). When the start key 43 is operated, the control unit 1 recognizes that a job execution start instruction has been issued. With the job execution start instruction issued (Yes at step #42), the control unit 1 (image processing unit 12), based on a set value set in the setting screen, generates image data to be used for the job (step #43). For example, the image processing unit 12 generates image data corresponding to a set resolution. Also, the image processing unit 12 generates image data corresponding to a set color (color or monochrome).

Then, the control unit 1 controls the job execution unit to execute a job based on the generated image data (step #44). When the print job is selected, the control unit 1 controls the printing unit 5 to execute printing based on the image data. In this case, the printing unit 5 functions as the job execution unit. When the transmission job is selected, the control unit 1 controls the communication unit 14 to execute transmission of the image data. In this case, the communication unit 14 functions as the job execution unit. When the facsimile transmission job is selected, the control unit 1 controls the communication unit 14 to execute facsimile transmission of the image data based on facsimile standards. In this case, the communication unit 14 functions as the job execution unit. When the preservation job is selected, the control unit 1 controls the storage unit 3 to store therein the precedently-read image data D1 as a document in nonvolatile fashion. In this case, the storage unit 3 functions as the job execution unit.

After the start of the job, the control unit 1 cancels the prohibition of transitions to screens other than predetermined screens (step #45). As a result of this, the user is enabled to operate the operation panel 4 for transitions to desired screens. Then, this flow is ended.

(Automatic Deletion of Precedently-Read Image Data D1)

Next, an example of an automatic-deletion flow of precedently-read image data D1 in the multifunction peripheral 100 according to this embodiment is explained with reference to FIG. 14. With the first precedent reading mode or the second precedent reading mode selected, when precedent reading is started, the control unit 1 prohibits any transition to a screen other than predetermined screens (step #21, step #31).

However, even though the precedent reading has been executed, yet the user may leave the multifunction peripheral 100 as the job remains unexecuted. On condition that the precedent reading has been executed, the transition to any screen other than predetermined screens is prohibited, making the multifunction peripheral 100 unusable for other users. There may be cases where the user desires to cancel the job even after the execution of the precedent reading. After the precedent reading, the job based on the precedently-read image data D1 is not necessarily executed.

Accordingly, the control unit 1 decides whether or not the prohibition should be canceled. In other words, the control unit 1 decides whether or not the precedent reading mode should be canceled. Upon a decision that it should be canceled, the control unit 1 automatically deletes unnecessary precedently-read image data D1. A processing flow therefor will be described below with reference to FIG. 14.

Figure 14:
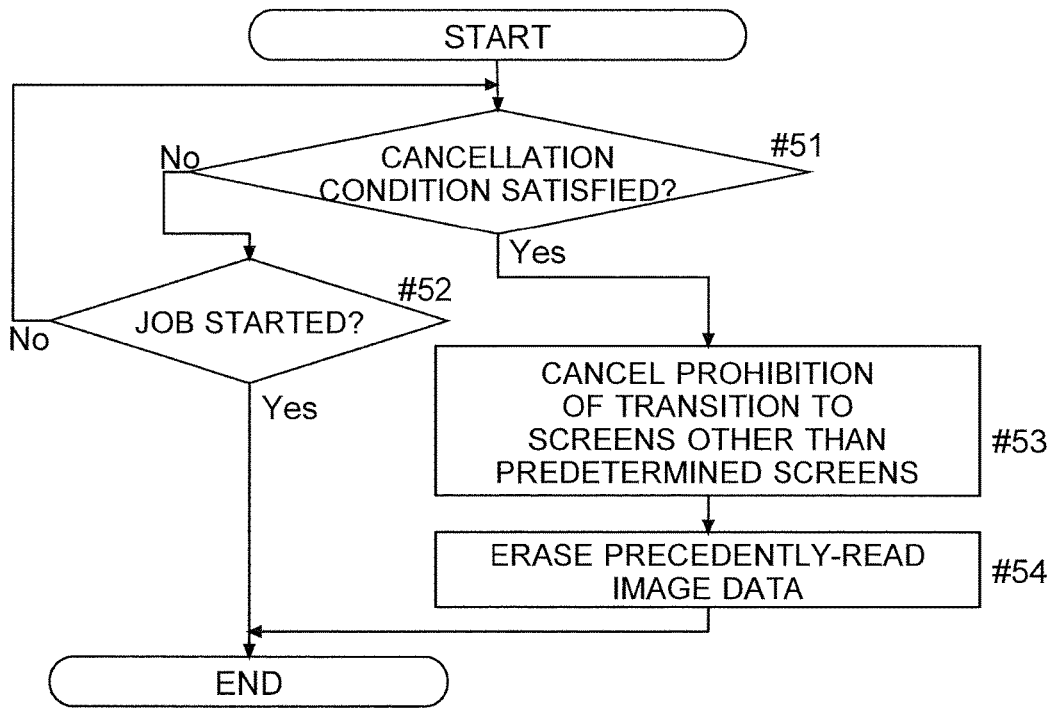
FIG. 14 is a flowchart showing one example of a flow of automatic deletion of precedently-read image data in the multifunction peripheral according to the embodiment.

A start in FIG. 14 is at a time point when precedent reading is started. In other words, the start in FIG. 14 is at a time point when prohibition of any transition to a screen other than the predetermined screens is started. First, the control unit 1 decides whether or not a cancellation condition has been satisfied (step #51). The cancellation condition is previously determined. The cancellation condition may be provided in plurality.

For example, when the cancel key 44 is operated, the control unit 1 decides that the cancellation condition has been satisfied. The cancel key 44 is provided in the operation panel 4 (display panel 41) (see FIG. 2). For cancellation of the job based on the precedently-read image data D1 even after execution of the precedent reading, the user needs only to operate the cancel key 44.

Also, the control unit 1 may decide that the cancellation condition is satisfied when a time duration with no operation performed on the operation panel 4 has lasted for a predetermined automatic reset time T1. The control unit 1 (timer 13) counts the time with no operation performed on the operation panel 4 (see FIG. 1). The control unit 1 resets the count time to zero when a touch is made on the touch panel 42. A first starting point of the count time is a time point when precedent reading is started. Also, the time point when the touch panel 42 is touched becomes a renewed starting point. When the multifunction peripheral 100 (operation panel 4) has been left out of operation after precedent reading, the control unit 1 decides that the cancellation condition has been satisfied.

The automatic reset time T1 may be set by the operation panel 4. The storage unit 3 stores therein a set automatic reset time T1 in nonvolatile fashion (see FIG. 1). The automatic reset time T1 may be set within a range of ten odd seconds to several minutes as an example. When the count time has reached the automatic reset time T1, the control unit 1 executes automatic reset process. In the automatic reset process, the control unit 1 resets all of job-related set values to default values. The default values for individual set values have been stored in the storage unit 3 in nonvolatile fashion (see FIG. 1). Also in the automatic reset process, the control unit 1 controls the display panel 41 to display a predetermined initial screen.

In addition, under the condition that use of the authentication function has been selected, the control unit 1 may execute automatic log-out process when the count time has reached the automatic reset time T1. Also in the automatic log-out process, the control unit 1 resets all of job-related set values. Further, in the automatic log-out process, the control unit 1 controls the display panel 41 to display a predetermined log-in screen (screen for input of user information 8). Then, the control unit 1 sets the operation panel 4 into a log-out state.

Upon deciding that the cancellation condition is unsatisfied (No at step #51), the control unit 1 confirms whether or not a job based on the precedently-read image data D1 has been started (step #52). With the job started (Yes at step #52), the control unit 1 cancels the transition prohibition (step #45, FIG. 13). Therefore, when the job has been started (Yes at step #52), this flow is ended (END). When no job has been started (No at step #52), the flow returns to step #51.

Upon deciding that the cancellation condition has been satisfied (Yes at step #51), the control unit 1 cancels the transition prohibition to screens other than the predetermined screens (step #53). In order to reduce unnecessary data, the control unit 1 controls the storage unit 3 to erase the precedently-read image data D1 (step #54). Then, the flow is ended.

As described hereinabove, the image forming apparatus according to this embodiment includes a reading unit 2, a setting detection unit 69, a display panel 41, an operation unit, a storage unit 3, a control unit 1, and a job execution unit. The reading unit 2 reads set document sheets one by one to generate image data. The setting detection unit 69 detects a setting of a document. The display panel 41 displays screens and images. The operation unit accepts user's operations. The storage unit 3 stores data therein. The job execution unit executes jobs. On a basis of an output of the setting detection unit 69, the control unit 1 recognizes a document setting onto the reading unit 2. Upon recognizing a document setting, the control unit 1 controls the reading unit 2 to execute precedent reading that is reading of the document set on the reading unit 2. The control unit 1 controls the storage unit 3 to store precedently-read image data D1 that are image data acquired by the precedent reading. After the start of the precedent reading, the operation unit accepts an operation of selecting a job type to be executed by using the precedently-read image data D1. The control unit 1 controls the display panel 41 to display a setting screen corresponding to a job type selected by the operation unit. When the operation unit has accepted a job execution start instruction, the control unit 1 controls the job execution unit to execute the job based on the precedently-read image data D1. As a result, document reading is executed before or during the execution of job-related settings. Waiting time for document reading can be reduced. The time point of job execution start can be accelerated as much as possible. The user needs only to execute the setting as usual, involving no complicated operations. The time required from setting start until job completion is reduced without causing any increases in burdens on user's setting operations.

When the precedent reading is started, the control unit 1 controls the display panel 41 to display a document list screen 92 in which documents stored as image data in the storage unit 3 are listed (first precedent reading mode). When a document corresponding to the precedent reading is selected in the document list screen 92, the control unit 1 controls the display panel 41 to display a box function screen 93 in which displayed are one or plural page images P1 that are scale-down images of pages contained in the precedently-read image data D1. As a result of this, it is made implementable to execute all of jobs involving document reading via the box function screen 93. It is made possible to eliminate an entrance screen for such functions as copy and transmission. Thus, setting operations are facilitated more than ever. Also, there can be provided an operational feeling other than ever. The user does not need to memorize setting operations for individual functions, respectively, such as copy, transmission, and box. The user needs only to be acquainted with box function-related setting operations.

Also, the control unit 1 makes type selection images i1 displayed in the box function screen 93, the type selection images i1 being for selection of a job type to be executed by using the precedently-read image data D1. The control unit 1 also makes a job setting screen, which corresponds to an operated type selection image i1, displayed in the display panel 41. As a result of this, in the box function screen 93, it is made possible to easily select which job is to be executed based on the precedently-read image data D1.

While the document list screen 92 is displayed based on precedent reading, the operation panel 4 accepts no selection of a document except a document based on the precedent reading. As a result of this, with the precedent reading executed, such a restriction can be effected that only the precedently-read image data D1 is selectable. That is, it can be made impossible to select any document unrelated to the precedent reading. Processing related to the document subjected to the precedent reading can first be executed.

Also, the operation panel 4 accepts an operation of selecting among page images P1. The control unit 1 controls the job execution unit to execute a job based on image data of pages corresponding to selected page images P1 out of the precedently-read image data D1. As a result of this, it is made possible to select image data of pages that are desired for the job. Job execution can be fulfilled without involving image data of unnecessary pages.

After the precedent reading has been started, the control unit 1 may control the display panel 41 to display the job type selection screen 95 for selection of a job type to be executed by using the precedently-read image data D1 (second precedent reading mode). The control unit 1 controls the display panel 41 to display a setting screen corresponding to a job type selected by the operation unit. As a result of this, only selecting a job type makes it possible to start a setting of set values related to a job using the precedently-read image data D1.

Also after a start of the precedent reading until a start of a job of the type selected by the operation unit, the control unit 1 prohibits display of screens other than the setting screen for the job using the precedently-read image data D1. As a result of this, it is made possible to restrict the display of screens unrelated to the job using the precedently-read image data D1. It can be arranged that processing related to the document subjected to the precedent reading is first executed.

Also, the control unit 1 decides whether or not a cancellation condition related to the prohibition cancellation has been satisfied. Upon deciding that the cancellation condition has been satisfied, the control unit 1 cancels the prohibition and controls the storage unit 3 to erase the precedently-read image data D1. As a result of this, precedently-read image data D1 that have been subjected to precedent reading but are not used can be automatically deleted. Cluttering the storage area with unnecessary image data can be prevented.

In some cases, information may be provided on both sides of document sheets. In this case, it may be desired to use, for the job, image data of top-and-back both sides of the document sheets. Therefore, in the precedent reading, the reading unit 2 reads both sides of set document sheets to generate image data of both sides of the document sheets as the precedently-read image data D1. As a result of this, image data of top-and-back both sides of the document sheets can be used for the job.

In recent years, back-side sheets may be used for printing from the viewpoint of effective use of resources. Back-side sheets refer to sheets having one side already printed. The unprinted side of the sheets is put into use. For example, one-side printed sheets that have undergone misprints are used as back-side sheets. One-side printed sheets that have become unnecessary may also be used as back-side sheets. With back-side sheets used as document sheets, there are some cases where only one side of the document sheets is to be used for the job. There are also cases where image data of an unnecessary side out of both sides is to be blocked from being used for the job. Accordingly, when an operation of deleting image data of one side of the document sheets is performed on the operation panel 4, the control unit 1 controls the storage unit 3 to execute the deletion of image data of one side of the document sheets out of the precedently-read image data D1. When the operation of deleting image data of the other side of the document sheets is performed on the operation panel 4, the control unit 1 controls the storage unit 3 to execute the deletion of the image data of the other side of the document sheets out of the precedently-read image data D1. As a result of this, it is achievable with simple operation to collectively delete the image data of one side or the other side of the document sheets. Use of the image data of unnecessary pages in the job can be prevented.

Although an embodiment of this disclosure has been fully described hereinabove, yet the disclosure is not limited to the scope of this description and may be carried out with various modifications unless those modifications depart from the gist of the disclosure.

What is claimed is:
1. An image forming apparatus comprising:
 a storage unit which stores various types of data and control programs, the storage unit including ROM, RAM, and an HDD;
 a reading unit which reads set document sheets one by one to generate image data, the reading unit including
  a light source, a lens, and an image sensor for reading one side of a document sheet, and
  a light source, a lens, and an image sensor for reading another side of the document sheet;
 a setting detection unit which is a sensor for detecting whether or not a document sheet is present on the document tray;
 an operation panel includes a display panel and a touch panel;
 a job execution unit which executes a job, the job execution unit including a communication connector, a communication circuit, communication memory, the ROM, the RAM, and the HDD; and
 a control unit including a CPU and an image processing unit and configured to
  recognize a document setting onto the reading unit on a basis of an output of the setting detection unit;
  upon recognizing the document setting, control the reading unit to execute precedent reading for reading the document set on the reading unit;
  control the storage unit to store therein precedently-read image data that are image data acquired by the precedent reading;
  after starting of the precedent reading and when the operation panel has accepted an operation of selecting a job type to be executed by using the precedently-read image data, control the display panel to display a setting screen corresponding to the job type selected by the operation panel; and
  when the operation panel has accepted a job execution start instruction, control the job execution unit to execute a job based on the precedently-read image data,
 wherein
 during the precedent reading, the reading unit:
  reads both sides of set document sheets; and
  generates image data of both sides of the document sheets as the precedently-read image data,
 when an operation of deleting one-side image data of document sheets is performed on the operation pane, the control unit controls the storage unit to delete one-side image data of the document sheets out of the precedently-read image data, and when an operation of deleting the other-side image data of the document sheets is performed on the operation panel, the control unit controls the storage unit to delete the other-side image data of the document sheets out of the precedently-read image data.

2. The image forming apparatus according to claim 1, wherein
upon a start of the precedent reading,
the control unit configured to
control the display panel to display a document list screen in which documents containing image data stored in the storage unit are arrayed;
control the display panel to display a box function screen when a document corresponding to the precedent reading is selected on the document list screen; and
make a display in which one or plural page images obtained by scaling down pages contained in the precedently-read image data are displayed in the box function screen.

3. The image forming apparatus according to claim 2, wherein
the control unit configured to
issue an instruction for displaying, in the box function screen, type selection images for selection of a job type to be executed by using the precedently-read image data; and
issue an instruction for displaying, on the display panel, a setting screen for a job corresponding to an operated one of the type selection images.

4. The image forming apparatus according to claim 2, wherein
while the document list screen is displayed based on the precedent reading,
the operation panel accepts no selection of a document except a document based on the precedent reading.

5. The image forming apparatus according to claim 2, wherein
the operation panel accepts an operation of selecting among the page images, and
the control unit controls the job execution unit to execute a job based on image data of pages corresponding to selected ones of the page images out of the precedently-read image data.

6. The image forming apparatus according to claim 2, wherein
the control unit configured to
add a mark to selected ones of the page images out of the precedently-read image data; and
block unselected pages from being marked with the mark.

7. The image forming apparatus according to claim 1, wherein
upon a start of the precedent reading,
the control unit configured to
control the display panel to display a job type selection screen for selection of a job type to be executed by using the precedently-read image data; and
control the display panel to display a setting screen corresponding to a job type selected by the operation unit.

8. The image forming apparatus according to claim 1, wherein
after a start of the precedent reading and until a start of a job of a type selected by the operation unit,
the control unit prohibits display of any screen other than a setting screen for a job using the precedently-read image data.

9. The image forming apparatus according to claim 8, wherein
the control unit configured to
decide whether or not a cancellation condition related to cancellation of the prohibition has been satisfied; and
upon deciding that the cancellation condition has been selected, cancel the prohibition and control the storage unit to erase the precedently-read image data.

10. A control method for an image forming apparatus comprising the steps of:
reading set document sheets one by one to generate image data;
displaying a screen and an image;
accepting a user's operation;
storing data;
executing a job;
recognizing a document setting onto a reading unit;
upon recognition of the document setting, executing precedent reading for reading the document set on the reading unit;
storing precedently-read image data that are image data acquired by the precedent reading;
after a start of the precedent reading and when an operation unit has accepted an operation of selecting a job type to be executed by using the precedently-read image data, displaying a setting screen corresponding to a job type selected by the operation panel;
when the operation panel has accepted a job execution start instruction, executing a job based on the precedently-read image data;
during the precedent reading, reading both sides of set document sheets;
during the precedent reading, generating image data of both sides of the document sheets as the precedently-read image data;
when an operation of deleting one-side image data of document sheets is performed on the operation panel, controlling the storage unit to delete one-side image data of the document sheets out of the precedently-read image data; and
when an operation of deleting the other-side image data of the document sheets is performed on the operation panel, controlling the storage unit to delete the other-side image data of the document sheets out of the precedently-read image data.

* * * * *